(12) United States Patent
Tsirinsky-Feigin

(10) Patent No.: US 8,705,541 B2
(45) Date of Patent: Apr. 22, 2014

(54) NETWORK GATEWAY FOR TIME-CRITICAL AND MISSION-CRITICAL NETWORKS

(75) Inventor: Larisa Tsirinsky-Feigin, Rosh-Haain (IL)

(73) Assignee: E.S. Embedded Solutions 3000 Ltd., Tel Aviv (IL)

( * ) Notice: Subject to any disclaimer, the term of this patent is extended or adjusted under 35 U.S.C. 154(b) by 413 days.

(21) Appl. No.: 12/962,420

(22) Filed: Dec. 7, 2010

(65) Prior Publication Data

US 2011/0075677 A1 Mar. 31, 2011

Related U.S. Application Data

(63) Continuation of application No. PCT/US2009/043887, filed on May 14, 2009.

(60) Provisional application No. 61/060,270, filed on Jun. 10, 2008.

(51) Int. Cl.
*H04L 12/28* (2006.01)
*H04L 29/06* (2006.01)
*H04B 7/185* (2006.01)

(52) U.S. Cl.
CPC ........ *H04L 63/0263* (2013.01); *H04B 7/18586* (2013.01); *H04L 63/0236* (2013.01); *H04B 7/18565* (2013.01)
USPC ........ 370/401; 370/230.1; 370/235; 370/392; 370/412; 709/217; 709/218; 709/219; 709/232

(58) Field of Classification Search
CPC .................................................. H04B 7/18586
See application file for complete search history.

(56) References Cited

U.S. PATENT DOCUMENTS

| 4,387,391 | A | * | 6/1983 | Hecker | 348/144 |
|---|---|---|---|---|---|
| 4,608,710 | A | * | 8/1986 | Sugiura | 725/68 |
| 5,491,802 | A | * | 2/1996 | Thompson et al. | 709/236 |
| 5,570,366 | A | * | 10/1996 | Baker et al. | 370/312 |
| 5,742,336 | A | * | 4/1998 | Lee | 348/144 |
| 5,909,433 | A | * | 6/1999 | Haartsen | 370/337 |
| 5,926,758 | A | * | 7/1999 | Grybos et al. | 455/429 |
| 5,970,066 | A | * | 10/1999 | Lowry et al. | 370/353 |
| 6,085,235 | A | * | 7/2000 | Clarke et al. | 709/219 |
| 6,222,823 | B1 | * | 4/2001 | Smith et al. | 370/230 |
| 6,381,646 | B2 | * | 4/2002 | Zhang et al. | 709/227 |
| 6,460,085 | B1 | * | 10/2002 | Toporek et al. | 709/233 |
| 6,578,082 | B1 | * | 6/2003 | Ho et al. | 709/233 |
| 6,680,906 | B1 | * | 1/2004 | Nguyen | 370/229 |
| 6,842,264 | B1 | * | 1/2005 | Leyva et al. | 358/1.15 |
| 6,857,009 | B1 | * | 2/2005 | Ferreria et al. | 709/219 |
| 7,177,316 | B1 | * | 2/2007 | Pilecek | 370/400 |

(Continued)

OTHER PUBLICATIONS

Written Opinion and International Search Report for corresponding International application No. PCT/US2009/043887 mailed Jan. 22, 2010.

*Primary Examiner* — Ian N Moore
*Assistant Examiner* — Dung B Huynh
(74) *Attorney, Agent, or Firm* — Myers Wolin, LLC

(57) ABSTRACT

A network gateway for time-critical and mission-critical networks is provided. The network gateway comprises a decision unit for determining, based on at least one network event; a processing unit for processing frames determined to be associated with the at least one service; a queue for buffering frames; and a traffic shaper for performing bandwidth management on frames stored in the queue.

19 Claims, 3 Drawing Sheets

(56) References Cited

U.S. PATENT DOCUMENTS

| | | | |
|---|---|---|---|
| 7,509,397 B1* | 3/2009 | Totty et al. | 709/219 |
| 7,849,507 B1* | 12/2010 | Bloch et al. | 726/22 |
| 8,005,083 B1* | 8/2011 | Diep | 370/389 |
| 8,098,671 B1* | 1/2012 | DeRuijter et al. | 370/401 |
| 8,218,543 B2* | 7/2012 | Batteram et al. | 370/389 |
| 2001/0022783 A1* | 9/2001 | Ohki | 370/338 |
| 2002/0016858 A1* | 2/2002 | Sawada et al. | 709/238 |
| 2002/0032869 A1* | 3/2002 | Lamberton et al. | 713/200 |
| 2002/0087725 A1* | 7/2002 | Cummings et al. | 709/243 |
| 2002/0103924 A1* | 8/2002 | Nomura | 709/235 |
| 2002/0178396 A1* | 11/2002 | Wong et al. | 714/4 |
| 2003/0043853 A1* | 3/2003 | Doyle et al. | 370/489 |
| 2003/0058860 A1* | 3/2003 | Kunze et al. | 370/392 |
| 2003/0084130 A1* | 5/2003 | D'Annunzio | 709/220 |
| 2003/0084174 A1* | 5/2003 | D'Annunzio et al. | 709/230 |
| 2003/0229714 A1 | 12/2003 | Kiremidjian et al. | |
| 2004/0071148 A1* | 4/2004 | Ozaki et al. | 370/401 |
| 2004/0071164 A1* | 4/2004 | Baum | 370/469 |
| 2004/0190522 A1* | 9/2004 | Aerrabotu et al. | 370/395.3 |
| 2004/0264488 A1* | 12/2004 | Yoon et al. | 370/412 |
| 2005/0078668 A1* | 4/2005 | Wittenberg et al. | 370/389 |
| 2005/0204062 A1* | 9/2005 | Sekine et al. | 709/245 |
| 2005/0213586 A1* | 9/2005 | Cyganski et al. | 370/395.41 |
| 2006/0013210 A1* | 1/2006 | Bordogna et al. | 370/389 |
| 2006/0095472 A1* | 5/2006 | Krikorian et al. | 707/104.1 |
| 2006/0209830 A1* | 9/2006 | Oguchi et al. | 370/392 |
| 2006/0212540 A1* | 9/2006 | Chon et al. | 709/218 |
| 2006/0256817 A1* | 11/2006 | Durst | 370/466 |
| 2006/0293049 A1* | 12/2006 | Jensen | 455/431 |
| 2007/0153690 A1 | 7/2007 | Stanwood et al. | |
| 2007/0171825 A1* | 7/2007 | Roberts et al. | 370/235 |
| 2008/0019388 A1 | 1/2008 | Harmon | |
| 2008/0052758 A1* | 2/2008 | Byrnes | 726/1 |
| 2008/0060035 A1* | 3/2008 | Tsang et al. | 725/109 |
| 2008/0127338 A1* | 5/2008 | Cho et al. | 726/22 |
| 2008/0222244 A1* | 9/2008 | Huang et al. | 709/203 |
| 2008/0279167 A1* | 11/2008 | Cardei et al. | 370/342 |
| 2009/0172156 A1* | 7/2009 | Yadav et al. | 709/224 |
| 2011/0035149 A1* | 2/2011 | McAndrew et al. | 701/205 |
| 2011/0125921 A1* | 5/2011 | Karenos et al. | 709/240 |
| 2012/0269196 A1* | 10/2012 | Jones et al. | 370/389 |
| 2013/0223444 A1* | 8/2013 | Liljenstolpe et al. | 370/392 |
| 2013/0272305 A1* | 10/2013 | Lefebvre et al. | 370/392 |

* cited by examiner

| Virtual Channel {IPs, PNs, IPd, PNd} | Service |
|---|---|
| 147.132.42.18, 80, 191.132.42.18, 88 | Redirect |
| 147.101.42.18, 80, 191.132.42.18, 88 | Retransmit |
| 155.101.42.18, 80, 155.132.42.18, 88 | Null |
| 155.101.42.18, 80, 155.101.42.18, 88 | Prioritize |
| 155.101.42.18, 80, 155.101.42.18, 88 | Encrypt |

NETWORK GATEWAY FOR TIME-CRITICAL AND MISSION-CRITICAL NETWORKS

CROSS REFERENCE TO RELATED APPLICATIONS

The present application is a continuation of International Patent Application No. PCT/US2009/043887 filed on May 14, 2009, now pending; the International Patent Application claims the benefit of U.S. provisional application No. 61/060,270 filed on Jun. 10, 2008, the contents of which are herein incorporated by reference.

TECHNICAL FIELD

The invention relates generally to data networks, and more particularly to network devices for allowing communications between ground and aerial data networks.

BACKGROUND OF THE INVENTION

A transport control protocol (TCP) is used extensively by many of the network communication applications including, for example, the World Wide Web (WWW), e-mail, file transfer protocol (FTP), streaming media applications, and the like. The TCP is a reliable stream delivery service that guarantees to deliver a stream of data sent from one host to another without duplication or losing data. The TCP implements a positive acknowledgment technique that includes retransmission of packets to guarantee reliability of packet transfers. This technique requires the receiver to respond with an acknowledgment message as it receives the packet, when such message is not received within a predefine time window, the sender retransmits the packet. As the TCP is optimized for accurate delivery, the protocol sometimes incurs relatively long delays and extensive bandwidth usage. Therefore, the TCP is not particularly suitable for applications where real-time delivery is needed.

A user datagram protocol (UDP) is usually utilized in applications require timely delivery. The UDP does not guarantee reliability or ordering of packets, thus packets (or datagrams) may arrive out of order, appear duplicated, or go missing without notice. The UDP is faster and less bandwidth consuming than the TCP as the overhead of checking when every packet actually arrives is eliminated.

In the related art network devices (e.g., gateways, switches, routers, etc.) implementing network communication using either a UDP or a TCP, cannot provide efficient mechanisms to support communication over special-purpose time-critical and mission-critical networks where both timely and guaranteed delivery are essential. Typically, such networks are utilized in military applications, communication between ground and aerial devices, and so on.

An example for a time-critical and mission-critical network is an IP military network that requires more complex architecture than a civilian IP network. At least the following factors contribute to this complexity: unstable end-to-end connectivity between a source device and a destination device in such a network: a limited bandwidth allowance per source and/or destination, a strict prioritization requirements, real-time requirements, and traffic and protocols restrictions because of special military network devices (e.g., gateways, encoders, firewalls, etc.).

Furthermore, such networks demand to support non-compromised requirements, such as bandwidth management over limited bandwidth, quality of service per every packet, no latency, transparency, and so on.

It would be therefore advantageous to provide a network device that can support the requirements of special-purpose data networks while being fully compliant standard network protocols and devices and fully transparent to other network entities.

SUMMARY OF THE INVENTION

Certain embodiments of the invention include network gateway. The network gateway includes a decision unit for determining based on at least one network event if each frame of incoming frames is associated with at least one service; a processing unit for processing frames determined to be associated with the at least one service; a queue for buffering frames; and a traffic shaper for performing bandwidth management on frames stored in the queue. The network gateway is fully transparent to other network entities.

Certain embodiments of the invention also include a method for enabling efficient data communication between a ground network and an aerial network. The method comprises transparently intercepting a frame flowing between the ground network and the aerial network; determining if at least one service is associated with an intercepted frame; processing the intercepted frame according to the at least one service being associated with the frame; and relaying the processed frame to a data link between the ground network and the aerial network.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 3 is an example for a service table constructed in accordance with an embodiment of the invention.

DETAILED DESCRIPTION OF THE INVENTION

Figure 1:
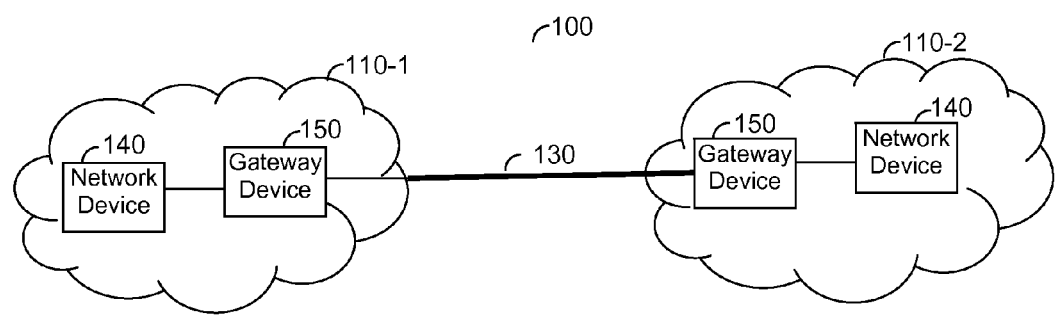
FIG. 1 is a diagram of a data network used to describe the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary diagram of a data network 100 used to describe the principles of the invention. The network 100 includes sub-networks 110-1 and 110-2 connected through a data link 130. Each of the sub-networks 110 include a network device 140 (e.g., a router, a switch, an airborne Ethernet switch, etc.) and a network gateway 150 constructed in accordance with certain embodiments of the invention. Each of the sub-networks 110 may be, for example, a local area network (LAN) and the data link 130 may be either a wireless link or a wired link adapted to carry UDP traffic. In a preferred embodiment the data link 130 is a wireless link connecting a ground sub-network 110-1 to an aerial sub-network 110-2. An example for such configuration may be controlling of systems installed in unmanned aerial vehicles (UAV), air plans, etc. from a ground station.

To enable reliable communication between the sub-networks 110-1 and 110-2, the gateway 150 supports all the requirements of special purpose data networks which include, but are not limited to, bandwidth management, quality of service per every message, no latency, transparency, and so on. With this aim, the network gateway 150 is a transparent device that monitors traffic flows between the sub-networks 110. Specifically, the network gateway 150 inspects the data frames flow between the sub-networks 110 and processes the frames based on predefined networks events. Acting as a transparent device, the network gateway 150 has no IP address that other network entities should address their frames to (an IP address may be used only for maintenance and configuration purposes). Network entities merely send frames to each other while the gateway 150 intercepts these frames at the data link layer. In certain embodiments of the invention the network gateway 150 may include the network device 140.

Figure 2:
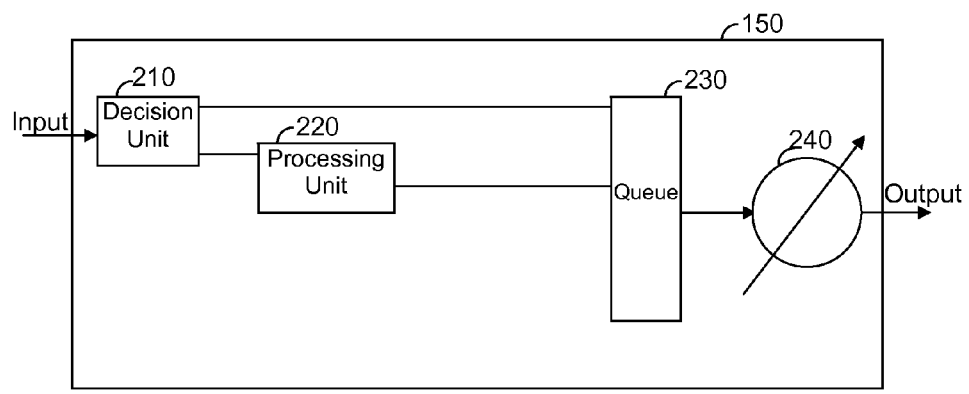
FIG. 2 is a block diagram of the network gateway realized in accordance with an embodiment of the invention.

FIG. 2 shows an exemplary and non-limiting block diagram of the network gateway 150 implemented in accordance with an embodiment of the invention. The network gateway 150 includes a decision unit 210, a processing unit 220, a queue 230 and a traffic shaper 240. The network gateway 150 inspects each incoming data frame, detects network events and determines based on the network events what type of services should be associated with the frames. A network event may be, for example, a predefined data pattern, a predefined frame sequence, a virtual channel, any combination of network addresses, and the like. A virtual channel carries traffic that always originates from the same source IP address and port number and directed to the same destination IP address and port number. That is, the virtual channel is defined as a combination of source/destination IP addresses and port numbers. The services that can be associated with a frame may include, but are not limited to, retransmission of the frames (i.e., guaranteed delivery), redirection of frames to one or more destinations, address resolution (e.g., acting as an ARP proxy), protocol conversion, bandwidth management, prioritization, encryption and decryption of data by implementing, for example, an IPSec protocol, signalling, alarming, and so on. The protocol conversion service enables converting an Internet protocol (IP) to legacy protocols, such as MIL-STD-1553, Hotlink; serial protocols, such as RS 485, RS 422, RS 235 and the like. In addition this service enables converting an analog video format to a digital format compliant with, for example, the H.264 and MPEG-4 formats. It is appreciated that the network gateway can be easily adapted to support other type of services and that the services listed above are merely examples.

The decision unit 210 receives an incoming frame relayed by a network device 140 and determines if further processing is required for that frame. The decision is taken using a service table stored in the decision unit 210. The table defines for each network event what should be the service(s) to be associated with frames comply with the detected event. An exemplary and non-limiting service table is provided in FIG. 3, where the network event is a virtual channel. Entries in the service table designated as "null" indicate that no processing is required on frames received on the respective virtual channels. Such frames are forwarded directly to the queue 230.

The service table is preconfigured and can be dynamically updated by a user (e.g., a system administrator).

To ensure in order transmission of frames while the decision unit 210 evaluates a frame, no new frames are received. It is appreciated that the evaluation of frames includes a look-up table operation to locate the respective virtual channel entry, thus there is no latency involved with the operation of the decision unit 210.

Frames that should be processed are input to the processing unit 220, which handles each frame according to the service(s) associated with the frames. Each service requires different handling by the processing unit 220. For example, to guarantee reliable delivery a copy of the frame is retransmitted predefined number of times, redirection of a frame includes modifying the destination IP address and port number to specify the new destination, dropped frames are not transmitted, conversion of unicast frames to multicast frames, and prioritizing of frames by inserting "prioritized" frames into the head of the queue 230. In fact, processed (non-prioritized) frames are saved in the queue 230 according to the order in which they were received.

The traffic shaper 240 retrieves frames stored in the queue 230 and performs the task of bandwidth management to meet the available bandwidth on the data link 130. Typically, traffic shaper 240, buffers a set of frames, thereby imposing additional delay on those frames such that they conform to a predetermined constraint of the data link's 130 bandwidth. This ensures elimination of burst transmissions and transmitting data at a transfer rate which is no higher than the permitted rate.

Figure 4:
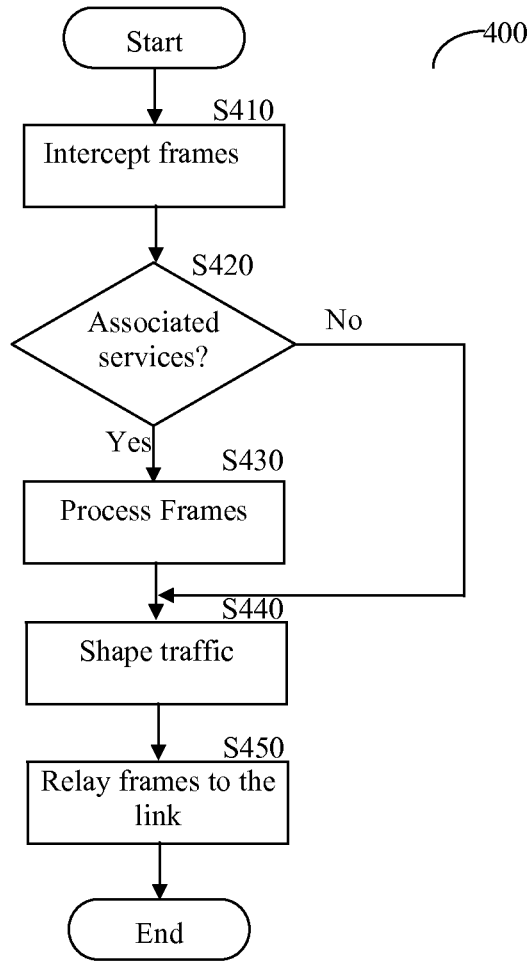
FIG. 4 is a flowchart describing the operation of the network gateway implemented in accordance with an embodiment of the invention.

FIG. 4 shows an exemplary and non-limiting flowchart 400 describing the operation of the network gateway 150 provided in accordance with an embodiment of the invention. At S410 a frame sent from a network device (e.g., device 140) is intercepted. At S420, a check is made to determine if one or more predefined services are associated with a frame. As mentioned above, the check is performed by matching a virtual channel of the frame and/or a network event against the service table. If S420 results with a "yes" answer the execution continues with S430; otherwise, the execution proceeds to S440.

At S430, the frame is processed according to service(s) associated with the frame. The processing tasks include, but are not limited to, redirection of the frame, dropping the frame, prioritizing the frame, retransmission of the frame, protocol conversion and address resolution. In a preferred embodiment the processing further includes generating alarms and signalling the users based on detected network events through the processing step. For example, a network event may be a frame that matches a predefined sequence, thus if such a frame is detected an alarm may be generated. As another example, the gateway 150 may signal the user if a frame is sent to or from an unknown address, which is an address that is not configured in the gateway. At S440, bandwidth management is performed by shaping "processed" and "non-processed" frames. Thereafter, at S450 frames are relayed to the data link 130.

The principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A network gateway for time-critical and mission-critical networks, comprising:
    a decision unit for transparently intercepting frames flowing between a ground network and an aerial network, wherein the frames are intercepted at a data link layer, the decision unit is further configured to determine based on at least one network event, if each frame of intercepted frames is associated with at least one service based on matching the at least one network event against a preconfigured service table mapping the at least one network event associated with an intercepted frame to the at least one service from among a plurality of services included in the preconfigured service table, wherein the ground network and the aerial network are the time-critical and mission-critical networks, wherein the at least one network event includes a virtual channel carrying traffic that always originates from the same source IP address and port number and directed to the same destination IP address and port number;
    a processing unit for processing frames determined to be associated with the at least one service;
    a queue for buffering frames; and
    a traffic shaper for performing bandwidth management on frames stored in the queue.

2. The network gateway of claim 1, wherein the at least one service comprises at least one of: retransmission of the frames, redirection of frames to one or more destinations, dropping of frames, address resolution, protocol conversion, bandwidth management, prioritization of frames, signalling, alarming, and data encryption.

3. The network gateway of claim 2, wherein the protocol conversion service enables converting at least Internet protocol (IP) frames to non-IP frames and converting non-IP protocol frames to IP frames.

4. The network gateway of claim 3, wherein the non-IP is a protocol selected from the group consisting of: MIL-STD-1553, RS 485, RS 422, RS 235, and Hotlink.

5. The network gateway of claim 2, wherein the protocol conversion service enables converting an analog video format to a digital video format compliant with H.264.

6. The network gateway of claim 2, wherein the protocol conversion service enables converting an analog video format to a digital video format compliant with MPEG4.

7. The network gateway of claim 1, wherein the at least one network event further comprises at least one of: a predefined data pattern, a predefined frame sequence, and any combination of network addresses.

8. The network gateway of claim 1, wherein the service table is a look-up table.

9. The network gateway of claim 1, wherein the decision unit forwards frames not being associated with a service directly to the queue.

10. The network gateway of claim 1, wherein the decision unit does not receive new frames while determining if an incoming frame is associated with at least one service.

11. The network gateway of claim 1, wherein the time-critical and mission-critical networks include at least an IP military network.

12. The network gateway of claim 11, further comprising an airborne Ethernet switch.

13. A method for enabling efficient data communication between a ground network and an aerial network, comprising:
    transparently intercepting a frame flowing between the ground network and the aerial network, wherein the frame is intercepted at a data link layer;
    determining if at least one service is associated with the intercepted frame based on matching at least one network event against a preconfigured service table;
    mapping the at least one network event associated with the intercepted frame to at least one service from among a plurality of services included in the preconfigured service table, wherein the at least one network event includes a virtual channel carrying traffic that always originates from the same source IP address and port number and directed to the same destination IP address and port number;
    processing the intercepted frame according to the at least one service being associated with the frame; and
    relaying the processed frame to a data link between the ground network and the aerial network, wherein the ground network and the aerial network are time-critical and mission-critical networks.

14. The method of claim 13, further comprising: performing bandwidth management operations on the processed frame or on a frame that was not processed, wherein the bandwidth management operations include at least one of buffering frames and rate shaping of frames.

15. The method of claim 13, wherein the at least one service comprises at least one of: retransmission of the frames, redirection of frames to one or more destinations, dropping of frames, address resolution, protocol conversion, bandwidth management, prioritization of frame, signalling, alarming, and data encryption.

16. The method of claim 13, wherein the protocol conversion service enables converting at least Internet protocol (IP) frames to non-IP frames and converting non-IP frames to IP frames.

17. The method of claim 13, wherein the at least one network event further comprises at least one of: a predefined data pattern, a predefined frame sequence, and any combination of network addresses.

18. A non-transitory computer readable medium having stored thereon computer executable code when executed causing a processor to perform the process of:
    transparently intercepting a frame flowing between the ground network and the aerial network, wherein the frame is intercepted at a data link layer;
    determining if at least one service is associated with the intercepted frame based on matching the at least one network event against a preconfigured service table;

mapping the at least one network event associated with the intercepted frame to the at least one service from among a plurality of services included in the preconfigured service table, wherein the at least one network event includes a virtual channel carrying traffic that always originates from the same source IP address and port number and directed to the same destination IP address and port number;

processing the intercepted frame according to the at least one service being associated with the frame; and relaying the processed frame to a data link between the ground network and the aerial network, wherein the ground network and the aerial network are time-critical and mission-critical networks.

19. The non-transitory computer readable medium of claim 18, further comprising: performing bandwidth management operations on the processed frame or on a frame that was not processed, wherein the bandwidth management operations include at least one of buffering frames and rate shaping of frames.

* * * * *